US009443158B1

(12) United States Patent
Haskins

(10) Patent No.: US 9,443,158 B1
(45) Date of Patent: Sep. 13, 2016

(54) METHOD FOR COMPUTER VISION TO RECOGNIZE OBJECTS MARKED FOR IDENTIFICATION WITH A BIGRAM OF GLYPHS, AND DEVICES UTILIZING THE METHOD FOR PRACTICAL PURPOSES

(71) Applicant: Kristopher Haskins, Socorro, NM (US)

(72) Inventor: Kristopher Haskins, Socorro, NM (US)

( * ) Notice: Subject to any disclaimer, the term of this patent is extended or adjusted under 35 U.S.C. 154(b) by 0 days.

(21) Appl. No.: 14/746,829

(22) Filed: Jun. 22, 2015

(51) Int. Cl.
*G06K 9/00* (2006.01)
*G06K 9/20* (2006.01)
*G06K 9/62* (2006.01)
*G09B 21/00* (2006.01)

(52) U.S. Cl.
CPC ........... *G06K 9/2072* (2013.01); *G06K 9/6262* (2013.01); *G06K 9/6268* (2013.01); *G09B 21/003* (2013.01); *G09B 21/006* (2013.01)

(58) Field of Classification Search
USPC .................................................. 382/181–231
See application file for complete search history.

(56) References Cited

U.S. PATENT DOCUMENTS

| | | | | |
|---|---|---|---|---|
| 5,809,161 A | * | 9/1998 | Auty | G01P 3/38 340/937 |
| 2006/0050962 A1 | * | 3/2006 | Geiger | G06K 9/222 382/186 |
| 2007/0071278 A1 | * | 3/2007 | Cheng | G06K 9/033 382/100 |
| 2009/0028443 A1 | * | 1/2009 | Chen | G06K 9/6234 382/224 |
| 2009/0128871 A1 | * | 5/2009 | Patton | G06T 11/001 358/520 |
| 2009/0324083 A1 | * | 12/2009 | Campbell | G06K 9/3208 382/190 |
| 2010/0260420 A1 | * | 10/2010 | D'Agostino | G06K 9/344 382/176 |
| 2011/0090253 A1 | * | 4/2011 | Good | G06F 17/289 345/633 |
| 2011/0274354 A1 | * | 11/2011 | Nijemcevic | G06K 9/342 382/177 |

* cited by examiner

*Primary Examiner* — Alex Liew

(57) ABSTRACT

A method of identifying bigrams of glyphs within a digital image. Classifiers are configured through training to differentiate between glyph orientations, allowing for accurate pairing and positive identification of the bigram. Embodiments include assistive technology devices which read playing cards held in-hand by visually impaired users and convey the rank and suit of each card to the player by non-visual means.

12 Claims, 2 Drawing Sheets

METHOD FOR COMPUTER VISION TO RECOGNIZE OBJECTS MARKED FOR IDENTIFICATION WITH A BIGRAM OF GLYPHS, AND DEVICES UTILIZING THE METHOD FOR PRACTICAL PURPOSES

CROSS-REFERENCE TO RELATED APPLICATIONS

This application claims the benefit of provisional patent application No. 62/015,498, filed Jun. 22, 2014 by the present inventor.

FEDERALLY SPONSORED RESEARCH

None.

SEQUENCE LISTING

None.

BACKGROUND

Physical articles are often marked for positive visual identification. Various forms of Optical Character Recognition (OCR) have been developed to enable computer controlled equipment to identify many different marking strategies. Bar codes, both one dimensional and two dimensional (QR codes) are examples of marking schemes which are easy for machines to recognize, but are difficult for humans to decipher. Other marking methods are easier for humans and harder for machines to identify. One particular marking scheme which has been inadequately addressed is described here, along with previous approaches and their shortcomings. A particularly successful and flexible OCR method involves machine learning techniques such as Artificial Neural Networks (ANNs) and Support Vector Machines (SVMs).

A bigram constructed of two independent sets of glyphs can be used to uniquely mark items for identification. The most common example is that of a deck of playing cards. Each card is identified by a glyph from the set of ranks along with a glyph from the set of suits. Without both pieces of information the card cannot be uniquely identified. Additional decoration may be present which can aid proper identification, such as the common practice of repeating the suit glyph in a pattern across the face of a card, but this scheme breaks down for the court (face) cards. Such additional information also requires the entire face of each card be visible for processing. The remainder of the description and specification will reference the common playing card deck as it is a) so widely known, and b) directly applicable to several of the embodiments disclosed.

The accompanying Information Disclosure Statement includes an extensive list of relevant prior art references which show the approaches others have attempted to perform the task of identifying common playing cards within a digital image or video. The limitations each has imposed upon the problem in order to have any degree of success prevents any from functioning reliably within the context of a player holding a hand of cards in-hand. Several examples are provided here, along with a description of their shortcomings.

The gaming industry has inspired the most innovation regarding the recognition and identification of cards, primarily due to casinos' desire to combat cheaters and card counters. A number of card shoes and shufflers have been developed which scan cards as they are distributed to players, the dealer, and the board. All of these devices rely upon their tightly controlled mechanism to aid their recognition efforts. Even so, most prior art relies on additional markings printed on the cards, such as bar codes, for identification. Very few do more than mention briefly that an OCR algorithm, or an ANN could be used with existing card markings.

In U.S. Pat. No. 5,722,893 Hill does describe in detail the use of an ANN to classify the individual indicia printed on a playing card. His device, like most of the others, is a card shoe which scans cards individually as they travel through. Among the sensor technologies he lists specifically are Charge Coupled Devices (CCDs) and infrared cameras. His approach has several limitations which are shared by this class of prior art.

As previously mentioned, shoes and shufflers impose constraints which greatly simplify the process of card identification through an OCR utilizing an ANN. They dictate the distance from and orientation to the sensor with a small maximum allowable error tolerance. This allows for near perfect focus of the optical lens assembly. It also provides the location of each glyph with a minimum of error. The orientation of each glyph is fixed and known. Do to the opaque enclosure, any light source may be chosen for even illumination without requiring consideration of its effects outside the enclosure. Each card is processed individually so there is no need to identify which rank glyph is associated with which suit glyph.

A second, more advanced class of prior art is found primarily in scholarly articles. These approaches utilize a camera viewing playing cards laid out upon a table. Many restrict the location and orientation of the camera to the table. This class of prior art addresses more difficult problems than those operating within shufflers and shoes. The cards are allowed to rotate and translate across the plane of the tabletop. Lighting conditions may be inconsistent frame-to-frame or across the surface of the table (although some approaches prohibit this variable). With very few exceptions, all of these approaches requires that each card is cleanly surrounded by an even background. Many rely on accurately detecting one or more straight edges of each card to properly function, which is not often possible with cards held in-hand. No overlap between cards is tolerated, and background clutter is poorly handled. Most also require a clear view of the entirety of each card; objects in the foreground which obscure a card face will prevent operation or cause erroneous identification. While most handle rotation within the plane, none are equipped to process cards rotated along any other axis or arbitrary vector. These limitations make the solutions found in the prior art unsatisfactory for identifying cards held in-hand by a card player. A selection of prior art is listed here, with a few brief notes concerning each:

Chen, W-Y. & Chung, C.-H. (2010). *Robust poker image recognition scheme in playing card machine using hotelling transform, dct and run-length techniques.* Digital Signal Processing, 20(3), 769-779. Their approach requires vision of the entirety of each card, and each card must be isolated on an even background. The image processing pipeline used is quite fragile if non-card background or foreground elements interfere with card boundaries. These will prevent the post-Sobel binary closing operation from functioning as intended. Oblique views are not supported, the camera must be orthogonal to the card face. Rotation of cards is supported. The high computational complexity of the Hotelling transform makes it impractical for use within a responsive device with limited processing capability.

Hollinger, G., Ward, N., & Everbach, E. C. (2004). *Introducing computers to blackjack: Implementation of a card recognition system using computer vision techniques*. Colby College, Waterville. Their approach requires vision of the entirety of each card, and each card must be isolated on a black background. They comment on performance, "The system worked fairly well, but slight changes in card orientation or overall illumination could cause bad card identification"

Martins, P., Reis, L. P., & Teófilo, L. (2011). *Poker vision: playing cards and chips identification based on image processing*. In Pattern Recognition and Image Analysis (pp. 436-443).

Springer. The authors used two webcams, one to identify playing cards in the common area and another to identify the "hole cards". They placed the hole cards face down on a transparent plate, and positioned the "pocket cam" under the table to see these hidden cards' faces. In each case, the entirety of each card must be visible, and the edges must not overlap. "This algorithm relies on the great contrast between the poker table and the cards lying on it . . . ".

Zheng, C. & Green, R. (2007). *Playing card recognition using rotational invariant template matching*. In Proceedings of Image and Vision Computing New Zealand 2007, (pp. 276-281). Hamilton, New Zealand.

Presents a method to identify, rotate, scale, and identify a playing card within an image using template matching. They note that noise significantly impacts the accuracy, and that the approach can not be generalized to include cards with dissimilar faces.

Zutis, K. & Hoey, J. (2009). *Who's counting? real-time blackjack monitoring for card counting detection*. In Computer Vision Systems (pp. 354-363). Springer. Describes their system of monitoring blackjack games to identify card counting behavior. As part of their approach, cards are imaged and identified. The employ a SIFT algorithm face card recognition, and rely on pip counting to determine the rank of value cards. Their suit identification is poor, and unimportant for blackjack.

Other prior art included in the Information Disclosure Statement contains similar shortcomings.

Many of the disclosed embodiments are concerned with providing assistance to blind individuals. Blind people who wish to play card games currently have few choices. They can play over the Internet on sites such as Blind Cafe.Net. They can purchase special braille playing cards, provided they can read braille. They can use a smartphone app such as Digit-Eyes to read cards specially marked with a Quick Response Code (QR code). Each of these options has drawbacks and limitations which a general purpose playing card reader would address.

One of the joys of playing card games is the act of sitting with friends and family, and enjoying the camaraderie and company offered in their presence. Playing on the computer with acquaintances over the Internet is nice, but it doesn't necessarily provide the same experience as a live game with one's grandchildren.

The American Printing House for the Blind, in their 2012 Annual Report, reported that only 8.8% of legally blind children enrolled in a US elementary or high school read braille. It is estimated that fewer than 10% of blind adults can read braille. For those without this skill a braille deck is not useful. For those who are braille literate this still requires the perpetual purchase of expensive specialty decks as their old decks wear out. Some players also report that the time required to read a hand of braille cards is cumbersome and disruptive to the pace of play.

Specially marked decks for use with QR code readers, bar code scanners, etc. also require expensive replacement decks. These decks are often not available with the high quality papers and finishes that are standard on premium mass-produced decks. Interaction with a smartphone, which requires touching virtual buttons on a tactilely-featureless screen, during game play is also distracting, and can be difficult for the blind.

While prior art devices are likely effective for their intended uses, they do not describe a capable general purpose playing card reader. A general purpose playing card reader would be capable of recognizing standard playing cards over a broad range of distances, with any rotation relative to the sensor, and within a broad range of inclination toward or away from the sensor along any axis. It would also be capable of recognizing multiple partially-overlapping cards simultaneously, each independently assuming any rotation, inclination, and distance relative to the sensor. Disclosed herein are embodiments and a method which are capable of these tasks.

Again, playing cards are discussed as the most widely known example of items uniquely identified by a pair of glyphs, and the one which contains relevant prior art. This disclosure should be interpreted to include the broader scope of all marking systems utilizing a pair of glyphs for unique identification.

GLOSSARY

AI—Artificial Intelligence
ANN—Artificial Neural Network
bigram—A pair of written elements, here we are concerned with two glyphs printed with a rigid relationship
blob—A contiguous subset of pixels from an image which are logically considered grouped as a single unit.
bounding box—a rectangular region of an image containing the entirety of a blob. It may be aligned with the raster grid, or aligned along an arbitrary vector referred to as its 'primary axis'.
CCD—Charge Coupled Device
classifier—A configured instance of an algorithm which takes as input a feature set and provides as output a label indicating which classification it has assigned to the given input feature set. It may also provide a confidence score indicating a degree of certainty that this classification is correct.
CPI—Camera Parallel Interface
CPU—Central Processing Unit
CSI—Camera Serial Interface, defined by the MIPI Alliance
culling—The process of selectively removing items from a set based on some criteria.
DoF—Depth of Field
EEPROM—Electronically Erasable Programmable Read Only Memory
FoV—Field of View
glyph—A graphic symbol, a character, or pictograph
GPU—Graphics Processing Unit
IR—Infrared; electromagnetic radiation with wavelengths between 700 nm and 1 mm.
LED—Light Emitting Diode linkage—A logical connection between two glyph candidates. The collection of all linkages can be interpreted as a graph where the candidates are nodes, and the linkages are edges.

linkage vector—A geometrical representation of a linkage which includes the raster position of the originating and terminating glyph candidates' centroids, and consequently contains the distance between centroids as well as their angular relationship.

ML—A Machine Learner is an instance of a machine learning algorithm; its internal state having been configured through previous training.

OCR—Optical Character Recognition

OpenCV—Open Source Computer Vision Library

QR code—Quick Response code

RAM—Random Access Memory rank—A playing card's denomination: A,2,3,4,5,6,7,8,9,10,J,Q,K SoC—System on a Chip SSD—Solid State Disk suit—A playing card's family designation: Club, Diamond, Heart, Spade SVM—Support Vector Machine USB—Universal Serial Bus

SUMMARY

A method is disclosed for processing a digital photograph which results in recognition of any number of items each uniquely identified by a pair of glyphs. Several embodiments are disclosed which utilize this method for practical purposes. Playing cards are used as an example as they are intimately involved in many of the embodiments.

DRAWINGS

FIG. 01 is an exploded, perspective view showing the hardware components of Embodiment A01.

FIGS. 02A-D illustrate a few of the key steps in the glyph pair identification procedure using as an example a drawing of playing cards.

REFERENCE NUMERALS

Figure 1:
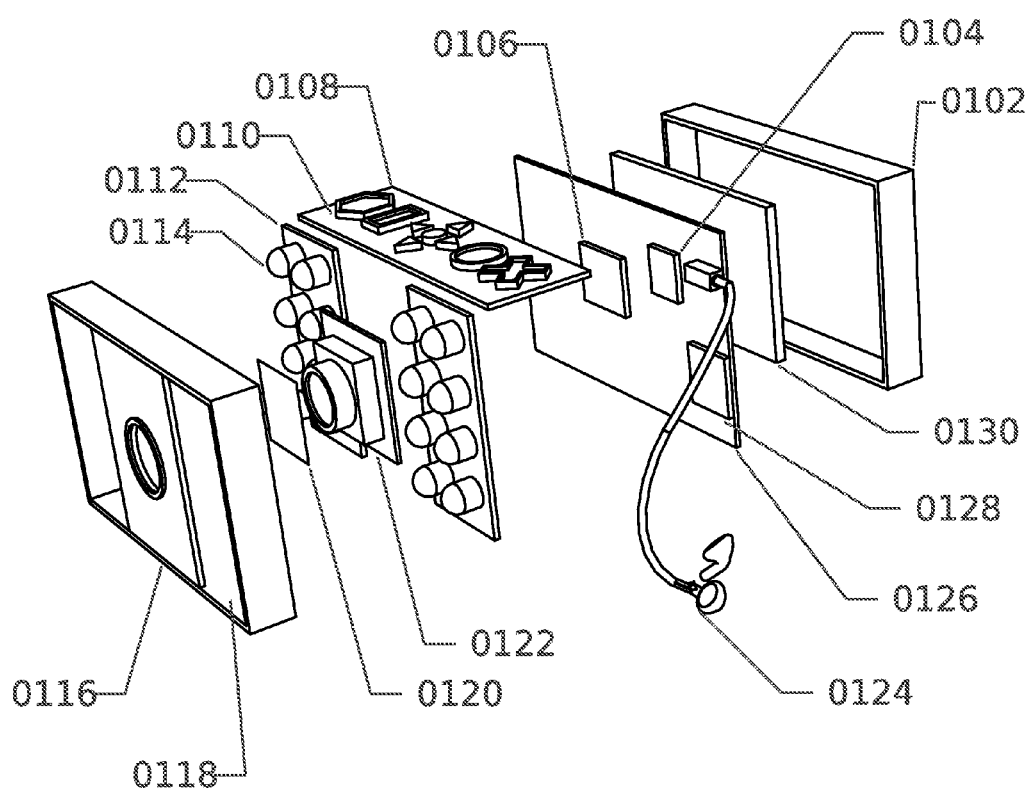

0102. Rear Housing
0104. Memory Chip
0106. System on a Chip/Processing Unit
0108. Keypad
0110. Row of Keys
0112. Array of Infrared Light Emitting Diodes
0114. Individual Light Emitting Diode
0116. Front Housing
0118. Diffusion Panel
0120. Infrared Passing Filter
0122. Camera System Module
0124. Headphones
0126. Single Board Computer
0128. Non-volatile Memory Storage
0130. Battery and Power Management Circuitry
0201. Linkage
0202 and 0203. Rectangular Bounding Box
0204 and 0205. Bounding Boxes rotated to vertical alignment

DETAILED DESCRIPTION

Method

Standard practice for developing software involves linking to existing libraries for existing functionality. This allows developers to concentrate more on the business logic and less on reinventing existing low-level functionality. One such library dedicated to computer vision tasks is Open Source Computer Vision Library (OpenCV). Several methods exposed by this library are utilized here. Other libraries which expose similar functionality could be used. Each of these methods could be independently written and included without linking to any external libraries.

A few terms may need introduction. In computer vision jargon a "blob" is a contiguous subset of pixels from an image which are logically considered grouped as a single unit after some processing stage. Throughout this method a blob is regarded as a glyph candidate until some procedure determines that it should no longer be considered in the search. Glyph candidates are referred to as glyphs, even though it may later be determined that the candidate was, in fact, not a glyph at all. Culling is the process of selectively removing items from a set based on some criteria. A Machine Learner (ML) is an instance of a machine learning algorithm; its internal state having been determined through previous training.

Several steps are concerned with reducing the number of glyph candidates which must be processed. These steps are marked as optional. A sufficiently powerful processor could be used to perform the calculations for every possible glyph and glyph pair found in the image. In practice most of these steps will be performed with parameters chosen to control the balance between execution speed and recall of the system.

Steps:
1. Acquire image from camera.
2. Smooth or blur the image to reduce sensor-induced image noise (optional).
3. Isolate individual "blobs" as glyph candidates.
4. Cull glyph candidates based on individual properties (optional).
5. Generate pair linkages between remaining glyph candidates.
6. Cull linkages based on relative properties between the pair of glyph candidates. (optional).
7. Calculate rotated rectangular bounding boxes for each glyph candidate.
8. Cull linkages based on relationships between a pair's rotated bounding boxes (optional).
9. Cull linkages based on relationships between a glyph's other pairings (optional).
10. Transform each glyph into a feature set suitable for input to classifier(s).
11. Feed each feature set into one or more classifiers.
12. Calculate a rotated rectangular bounding box containing both glyphs of each pair (optional).

13. Rotate each glyph pair to vertically align the combined rotated bounding box (optional).
14. Feed each rotated pair into a second set of machine learners (optional).
15. Combine the scores from 11 and 14 for each glyph pair to identify the pair.
16. Count and sort the identified pairs (optional).
17. Output the identified pairs.

Subroutine 1: Acquire Image from Camera.

The exact method used to interact with the camera will be largely determined by the type of camera and how it is connected to the processor. Any method which results in a recorded image being placed in the processor's memory is acceptable.

Subroutine 2: Smooth or Blur the Image.

Under low-light, or high-gain conditions the produced image may be noisy. Smoothing operations may be desirable to assist subsequent steps.

Subroutine 3: Isolate Individual "Blobs" as Glyph Candidates.

With sufficient processing power this step can be as simple as setting a pixel value threshold and using a label-generating flood-fill operation. Flood-fill is a standard procedure, one implementation available is OpenCV's cv::floodFill( ) method. One option to add labeling capabilities is to iterate over the pixels in the image, and call floodFill( ) to fill each matching region with an identification label. This overwrites the matching pixels' value such that it will not match the fill criteria when the iteration reaches a pixel which has already been filled.

If the embodiment's CPU is limited it may be desirable to handle some of this procedure on the GPU. In this case a number of shader programs are executed on the GPU, transforming the image through a pipeline of operators. Images from these stages may be saved and used as source material for later stages, rather than using the original image.

Many additional approaches for locating blobs in an image have been devised and discussed in the literature, and many of these may be used for this subroutine with little or no modification.

Figure 2A:
FIG. 02A is a simplified drawing representing an image of playing cards held in-hand, presented to a camera.

FIG. 02A illustrates this using playing cards as an example. The edges of cards may or may not be discernible, and thus isolated as blobs, due to lighting conditions.

Subroutine 4: Cull Glyph Candidates Based on Individual Properties

For a fixed focal length lens system the size of the glyphs within the image is a function of the object's proximity to the sensor. As the object nears the sensor it becomes larger. Measuring the extent of valid glyphs results in empirical parameters which may be used to discard a glyph candidate which deviates excessively from the norm. Any feature local to the individual glyph candidate in question could be used here to dismiss the candidate.

Subroutine 5: Generate Pair Linkages Between Remaining Glyph Candidates.

Figure 2B:
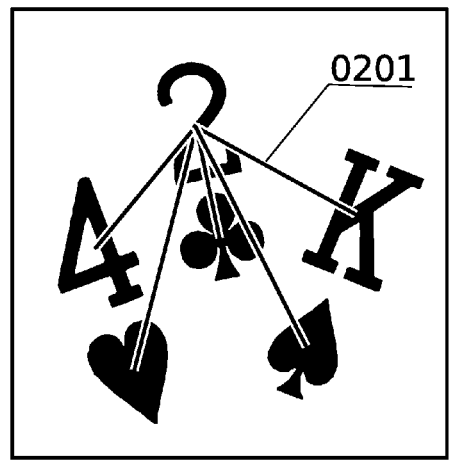
FIG. 02B shows individual blobs which have been isolated, and linkages between one blob, the numeral '2', and every other blob in the image.

Construct a fully-connected graph with the glyph candidates represented as nodes. A linkage between a pair of glyphs is defined as a non-zero weight to the edge connecting the nodes representing the glyphs. The assigned edge weight may have numerical significance, such as the euclidean distance between the glyphs' centroids. FIG. 02B illustrates this concept by showing the linkages formed between the glyph '2' and all other glyphs in the image.

Subroutine 6: Cull Linkages Based on Relative Properties Between the Pair of Glyph Candidates.

At this point each remaining glyph candidate is connected to every other glyph candidate by a linkage. By the end of the processing, no glyph will be connected to more than one other glyph. Eliminating a linkage reduces the processing necessary in subsequent steps. Relationships between the two glyphs such as distance and size ratio may be used to remove the pair from consideration. Setting the edge weight in the linkages graph to zero indicates the linkage is dissolved.

Subroutine 7: Calculate Rotated Rectangular Bounding Boxes for Each Glyph Candidate.

Figure 2C:
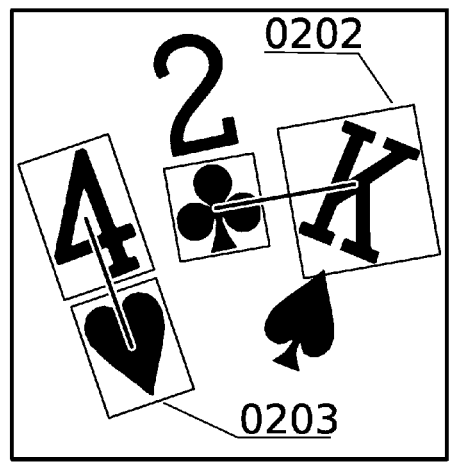
FIG. 02C illustrates linkages between two distinct pairs of blobs, and the rotated bounding boxes containing those blobs aligned with the linkage vector.

The initial bounding box surrounding each glyph is aligned with the vertical and horizontal axis of the image; theta=0. For each glyph calculate new minimum rectangular bounding boxes, each aligned parallel to the vector between its centroid and the centroid of the linked glyph. Each glyph will potentially receive multiple rotated bounding boxes, one for each linkage. FIG. 02C illustrates this concept by showing rotated bounding boxes parallel to linkages between the '4' and 'heart' glyphs, as well as those for linkages between 'K' and 'club'.

Subroutine 8: Cull Linkages Based on Relationships Between a Pair's Rotated Bounding Boxes.

Each linkage contains two rotated bounding boxes, one for each glyph. Relative information, such as the difference between their aspect ratios may be used to dismiss a linkage from further consideration.

Subroutine 9: Cull Linkages Based on Relationships Between a Glyph's Other Pairings.

Each glyph candidate has at least one linkage. For those with multiple linkages still under consideration, relationships between each linkage may be used to dismiss one or more of the glyph's linkages.

Subroutine 10: Transform Each Glyph into a Feature Set Suitable for Input to Classifier(s).

Subroutines 10 and 13 set up the features which will be presented to the classifier. As such they are arguably the most critical steps, and set this method apart. Many OCR approaches are concerned with maximizing the generality of a Machine Learner (ML), particularly with regards to rotation. This method explicitly relies on a classifier's ability to distinguish between a vertically oriented glyph and the same glyph in any other rotational orientation, and the MLs which comprise the classifier are configured by training to do just that.

The image used as feature inputs to the MLs can be chosen from any intermediate processing stage of the original image, or the original image itself. Subroutine 3 may contain much more complicated operations than are strictly necessary, and some of the intermediate steps may be appropriate as features for the classifiers. Examples may include edge detection, distance transforms, and medial axis transforms.

Whatever the choice of feature image, subroutines 10 and 13 are responsible for isolating the data contained within each rotated bounding box, and transforming that data by rotating and/or skewing it using simple trigonometry. The resulting matrix is reserved for the next step.

Figure 2D:
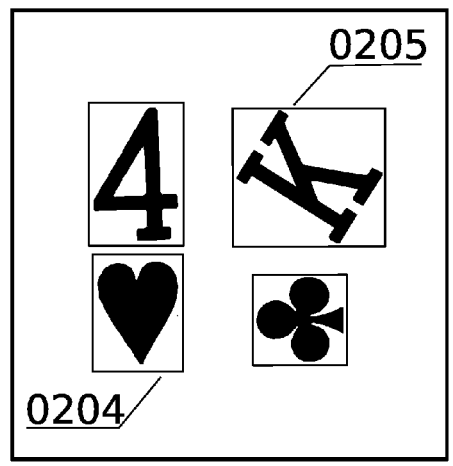
FIG. 02D depicts the same two distinct pairs of blobs after each pair has been oriented and aligned along its linkage vector. In this example image the 4 of Hearts will be correctly identified, and the King of Clubs will be properly rejected, by subsequent classifier stages.

FIG. 02D illustrates one possible transformation by simply rotating the bounding boxes (and their contents from the original image) to vertically align the linkage.

Subroutine 11: Feed Each Feature Set into One or More Classifiers.

Each transformed matrix from step 10 is presented to one or more classifiers, which may comprise a set of MLs, which have all been trained using data previously processed in the same manner. As mentioned in the subroutine 10 description, these classifiers have been configured to classify an improperly aligned glyph as unidentifiable. This is illustrated in FIG. 02D, where the 4 of Hearts is correctly identified, and the King of Clubs is rejected because the 'K' and the 'club' are incorrectly aligned. The weight vector output from each ML is saved for further analysis in Subroutine 15.

Every ML in the set is uniquely configured. They may differ in ways such as learning algorithm, activation function, topology, and training set. Care should be taken to avoid including multiple MLs which exhibit weakness at the same classification task during blind validation tests.

Subroutine 12: Calculate a Rotated Rectangular Bounding Box Containing Both Glyphs of Each Pair.

Similar to subroutine 7, but this time each bounding box is calculated to contain the entirety of both glyphs along a linkage.

Subroutine 13: Rotate Each Glyph Pair to Vertically Align the Combined Rotated Bounding Box.

As discussed in subroutine 10, but this time each bounding box contains the entirety of both glyphs along a linkage. The source image need not be the same as that chosen during subroutine 10.

Subroutine 14: Feed Each Rotated Pair into a Second Set of Machine Learners.

These MLs have been trained on previous output matrices from subroutine 13. As explained in the subroutine 10 discussion, these MLs have been trained to classify an improperly aligned glyph pair as unidentifiable. The weight vector output from each ML is saved for further analysis in Subroutine 15.

Subroutine 15: Combine the Scores from 11 and 14 for Each Glyph Pair to Identify the Pair.

Each ML produced an output vector for each glyph (subroutine 11) or linkage (subroutine 14). These vectors contain scores for each available class, the score's position within the vector corresponds to a particular class. If an output vector contains a single high score, and many low scores the generating ML can be said to have confidence that it has correctly classified the glyph. Multiple high scores, or no high scores indicates that the generating ML is less confident. Subroutines 12 through 14 are optional, and serve to increase accuracy and confidence in the result. They can be omitted provided the results from subroutine 11 are sufficient. Alternatively, subroutines 10 and 11 may be omitted in favor of 12, 13, and 14 if the pair classifier in subroutine 14 is sufficient.

Comparing the scores of different MLs allows for additional confidence metrics. There are many ways in which the collection of vectors can be processed to reach a final decision. The simplest effective method is:

Step 1: Define a threshold score.

Step 2: Determine the classification of each vector. An output vector with no scores above the threshold defaults to a classification of "unidentifiable". A single score above the threshold scores 1 "vote" for the corresponding classification. Multiple scores above the threshold should also be discarded in favor or an "unidentifiable" vote. Note that depending on the implementation, the vectors from subroutine 14 may be set up such that they should have two high scores, one for the first glyph set and one for the second.

Step 3: Define a minimum vote count. A reasonable value may be one larger than half the number of MLs employed, requiring a majority.

Step 4: Count the number of votes for each classification.

Step 5: Declare the pair's classifications. If either glyph did not achieve enough votes for a single classification the pair is declared unidentifiable.

Step 6: Determine which linkage is valid if a single glyph has multiple linkages. This may be as simple as counting which linkage has the most votes, or may involve calculations with the individual scores. Discard the invalidated linkages.

Other methods to combine the scores currently exist, and more will indubitably be devised in the future.

Subroutine 16: Count and Sort the Identified Pairs.

An optional configuration may require the count of glyph pairs be output before the classifications themselves. Another optional configuration controls the order in which the pairs are output: left-to-right, right-to-left, top-to-bottom, bottom-to-top. If these options are enabled the pairs are now sorted before proceeding.

Subroutine 17: Output the Identified Pairs.

Each embodiment will have an output mechanism. This may involve, but is not limited to, playing audio files sequentially, writing to external hardware, or sending messages to a separate networked computer.

DETAILED DESCRIPTION

Embodiments

Every embodiment possess a minimum set of features in common with each other embodiment. Additions to this base set of features are discussed for each embodiment following the description of the common feature set.

Each embodiment possesses a processing system comprising one or more Central Processing Units (CPUs), volatile Random Access Memory (RAM), non-volatile storage such as Electronically Erasable Programmable Read Only Memory (EEPROM), flash, optical disk, magnetic disk, or Solid State Disk (SSD). Each embodiment possesses one or more digital camera systems which at the minimum contain an imaging sensor such as Complementary metal-oxide-semiconductor (CMOS) or CCD, and the necessary circuitry to transmit the captured images to the processing system. Each embodiment possesses a means of outputting identification information after it has finished recognition; unless described otherwise each embodiment possesses one or more audio output devices, wired or wireless. Each embodiment executes a program which implements the method of glyph-pair identification disclosed herein.

Each embodiment may contain a Graphics Processing Unit (GPU). Embodiments so equipped may use alternative processing methods to split the workload between the CPU and GPU to achieve better results with lower latency. Each embodiment may possess a means of inputting user commands such as a keypad, keyboard, microphone, accelerometers, or touchscreen. Each embodiment may contain an internal battery, accept interchangeable batteries, or receive power from an outside source such as mains power. Each embodiment may contain a wired or wireless network interface to enable communication to and from external devices. Although not necessarily utilized, a visual output device such as a monitor or touchscreen may be included within any embodiment.

Camera systems operate by recording light incident upon their sensors. Unless recording emissive sources, the recorded light has previously been reflected from the subject. Embodiments may utilize existing ambient light, or they may possess internal or external light source(s) to provide sufficient illumination of the subject for proper exposure. Digital camera systems typically contain an infrared-blocking filter to prevent these wavelengths, which humans cannot perceive, from being recorded by the sensor. Embodiments may possess light source(s) which radiate entirely or primarily within the infrared (IR) wavelengths. These embodiments do not contain the customary IR-blocking filter, and may contain a filter which blocks the non-IR spectrum to which the sensor is sensitive.

There are many types of acceptable camera systems available for use. Consumer digital cameras may be connected to a processing system via common wired technologies such as Universal Serial Bus (USB), FireWire, and ethernet, or wirelessly over standards such as Bluetooth, ZigBee, WiFi, and cell phone networks. Camera systems intended for embedded applications may also communicate over dedicated camera bus(es) such as the Camera Serial Interface (CSI) and Camera Parallel Interface (CPI). Consumer webcams and many embedded cameras intended for laptops are typically connected over USB. Any system capable of recording at sufficient resolution and transmitting the frame data in a timely manner may be employed.

In addition to the purpose-built devices disclosed herein, there are several types of commercially available systems which are capable of operating the disclosed method with little or no modification. Consumer cell phones and tablets contain all the necessary, and much of the optional, hardware including CPU, GPU, memory, storage, networking, input via touchscreen, output via audio (potentially wireless), camera(s), and some include supplemental lighting to illuminate the subject. Laptops have more powerful processors, better graphics processors, faster memory, have a keyboard as additional input, and often include one or more cameras. With an addition of camera hardware desktop computers, workstations, servers, and the like may be used as suitable hardware provided the space and power requirements are not burdensome to the user.

Classification of Embodiments

Embodiments are classified by their function. Embodiment Class A comprises those embodiments intended as assistive devices for the blind and individuals with low vision. Class B comprises embodiments intended for surveillance, monitoring, and/or logging of identified glyph pairs. Class C comprises embodiments which combine aspects of Class A and B, allowing the blind to read exposed cards on a table for games such as stud poker. Class D comprises embodiments intended to be embedded within a computer vision or artificial intelligence system where identification is a single step within a larger system.

Description of Class A Embodiments

Many of the Class A embodiments have custom keypads designed such that each key is tactilely distinct. This may be accomplished with keys of differing shape, texture, position, and/or alignment. A raised or sunken pattern, such as braille, may adorn the surface of keys to convey additional information to the user. Keyboard technologies which generate significant haptic feedback such as dome-switch, scissor-switch, mechanical-switch, and bucking-spring are preferred, but less expensive technologies such as membrane keypads may be employed to reduce manufacturing costs.

Operation of Class A Embodiments

Class A embodiments are those which provide a single user, typically a blind person, the means to participate in live card games by reading to the user the cards held in the user's hand(s). The operating procedure, from the standpoint of the of the user, is now summarized.

Step 1: Supply power to the unit, and activate the power switch. In the case of a battery powered unit, simply activate the power switch.

Step 2: After booting, the unit will present a welcome message to the user via the connected output device—audio or tactile display. In the case of a unit with multiple capabilities this will also prompt the user for application selection; the user navigates to, and selects, the playing card reader application. For units which provide the playing card reader as the sole application no input is necessary. From this point forward the playing card reader operates without the need for user interaction.

Step 3: The user presents playing cards toward the unit's camera and within the frustum bounded to the sides, top, and bottom by the camera's Field Of View (FoV) and bounded inwards and outwards by the camera's Depth of Field (DoF).

Step 4: The unit notifies the user that it has acquired an image, and is processing the contents. This is often a tone over an audio interface or a specific character on a refreshable braille display. This is optional, as it may be distracting to some players.

Step 5: If no glyph pairs were identified with sufficient confidence, a failure notice is issued to the user. This is also often a tone over an audio interface or a specific character on a refreshable braille display. Again, optional if a player finds the notifications objectionable. Operation proceeds to Step 3.

Step 6: If so configured, the unit begins by informing the user of the number of cards it has identified. It then transmits the rank and suit of each card to the user. In the case of an audio interface, audio files which correspond to each individual card are sequentially played. In the case of a refreshable braille display of sufficient size the entire hand is displayed at once. If the display is too small the user navigates through cards using the controls on the display.

Apart from the normal operation, additional modes may be present to allow for configuration and calibration. Settings and parameters adjusted by these modes allow for a customized experience and/or enable better performance in non-typical environments. These modes are typically presented to the user as a set of menus which contain options for the user to select. This may be accomplished via a built-in keypad, and external keyboard, voice recognition, or input keys on a braille display. Settings and parameters may also be modified by directly manipulating the settings file(s) within the device's filesystem. This is typically accomplished from an attached or networked computer. Units without input mechanisms might rely on such direct manipulation of the settings for customized configuration. Alternatively, additional configuration and calibration modes may be invoked remotely through an attached or networked computer.

Embodiment A01, as illustrated in FIG. 1, comprises:
a) a Single Board Computer (SBC) 0126, on which resides a Memory Chip 0104, a Non-Volatile Memory 0128, a System on a Chip (SoC) 0106 containing a processing unit, graphics processing unit, memory control unit, Camera Serial Interface (CSI), and audio output,
b) an optical sensor, and necessary circuitry to form a camera system 0122 and 0120, optionally sensitive to infrared wavelengths for use with supplemental infrared illumination,
c) an optional array of infrared emissive elements 0112, typically Light Emitting Diodes (LEDs) 0114 which may be attached to the face of the device, attached to a mounting board in front of the main unit, simply laid on a table in front of the main unit, or absent,
d) an optional battery and corresponding power management circuitry 0130,
e) headphones or headset (wired or wireless) 0124,
f) an optional keypad 0108 with several tactilely distinct buttons 0110,
g) an enclosure 0102 and 0118 suitable for resting the unit on a tabletop, and
h) a non-volatile memory 0128 containing software which identifies glyph bigrams, as disclosed herein.

Embodiment A02 consists of any commercially available mobile computing device, such as a smartphone, tablet, or laptop, operating an application which identifies glyph bigrams, as disclosed herein.

Embodiment A03 is the same as embodiment A01, except the enclosure is wearable. It contains a clip, magnet, lanyard, or other means which allow the device to be attached to clothing or accessories such as eyeglasses, or hats.

Other Class A embodiments consist of various combinations of the optional features previously described.

Description of Class B Embodiments

Many class B embodiments are intended as surveillance systems for gaming establishments such as casinos. These embodiments possess one or more cameras mounted in the ceiling such that each has a clear view of a playing table. Each camera is connected to the processing unit over a wired or wireless connection. The processing unit is typically located some distance from the camera. If a sufficiently powerful processing unit is employed it may service several tables, each with their own camera(s). Other such systems, utilizing methods other than those disclosed herein, have been developed and employed for this purpose. Class B embodiments are designated as "Embodiment Bxx" where the "xx" is replaced by an identification number.

Operation of Class B Embodiments

Operation of class B surveillance embodiments is largely autonomous. After powering the system and launching the application users will typically monitor statistics collected during operation. Internally, the process repeats until terminated. Each frame captured from the camera is processed using the method disclosed herein to extract the identity of each card. The location of each card is then used within a clustering algorithm to determine to which player the card belongs. For those games which include community cards "on the board" these are clustered together and so identified. The clustering algorithm may be supplemented or replaced by pre-configured lines of demarcation which identify various playing regions, including players' hands, the dealer's hand, and community cards. This information is then collected and analyzed to locate potential situations of interest such as insufficiently random shuffling, card counting, and cheating.

Additional modes of operation may be available for configuration and calibration.

Embodiment B01 is a surveillance system. This embodiment possesses a single camera connected to a single processor. The processor is connected via a network to a database. Information from each hand is sent to the database. A separate workstation or server is responsible for processing the hand information.

Embodiment B02 is a surveillance system. This embodiment possesses multiple cameras connected to a single central, high-powered, processing system. This processing system may host a database for storing hand information, or it may send it to a separate, networked database. This system may possess a display to present statistical information to the surveillance team. Alternatively, workstations may connect to the database over a network connection; perform analysis and display results to the surveillance team.

Description of Class C Embodiments

Class C embodiments combine Class A and Class B features. These embodiments involve multiple cameras connected to a single processing unit with one or more output devices. They provide user(s) with the identity of face-up cards on the table as well as "hole" cards held in their hand. Games such as Euchre, Hearts, Spades, Cribbage, Hold-em, and Stud Poker all involve exposed and secret cards. Within some groups these games may be played with Class A devices as a sighted player can read aloud any exposed cards for those who cannot see them. Games such as Seven Card Stud, when played with seven players, potentially involve a tremendous number of exposed cards which may limit the feasibility of such an approach. Class C devices, particularly those that interface with the user through a refreshable braille display, address this by allowing the user to quickly read the exposed cards of each player at any time without disrupting the play of the game. Embodiments which read to the user over an audio device provide a method for the user to select which player's exposed cards to read. Class C embodiments are designated as "Embodiment Cxx" where the "xx" is replaced by an identification number.

Operation of Class C Embodiments

Operation of Class C embodiments proceeds much like Class A devices, with a few additions. As each frame from the table camera is processed, any new cards are read to the user(s) along with which player received the card. At any time the user may use the provided input methods to select a player to have the device recite that player's exposed cards. The same mechanism applies to community cards exposed on the table.

Additional modes may be available for configuration and calibration. One of the configuration modes allows for assigning names for each player.

Embodiment C01 possesses two cameras, one with a clear and focused view of the table, the other with a clear and focused view of the cards held within the user's hands. The processor handles frames from each camera in turn; notifying the user of changes as the game proceeds.

Embodiment C02 possess multiple cameras, one with a clear and focused view of the table, and an additional camera for each user serviced by the device. The processor handles frames from each camera in turn; notifying each user of changes to the user's hand and changes to the exposed cards on the table as the game proceeds.

Description of Class D Embodiments

Class D embodiments are simply extensions of Class C devices where the outputs of the playing card recognition method and card clustering method are fed into an Artificial Intelligence (AI) system which makes decisions based on this information.

Embodiment D01 is physically identical to embodiment C01. After each round of cards are dealt the unit will provide the user with additional information not provided by other classes of devices. Additional modes are available to configure which game is being played and what information is presented to the user. Options may include, but are not limited to, probabilities, outs to various potential hands, and recommended actions. Modes offered will depend on the game being played. This can be used as a training aid, to assist a new player, or to assist a mentally disadvantaged player during play.

Embodiment D02 is a robotic player. The AI accepts the card information and plays the selected game as an autonomous player. This allows for playing short handed; a four player game with only two or three human participants. Any robotic machine capable of manipulating the cards dealt and possessing the standard features common to all Class D embodiments is acceptable. Devices for this purpose, utilizing recognition methods other than those disclosed herein, have been presented with prior art.

Embodiment D03 is an AI player. All physical configurations possessing the standard features common to all Class D embodiments without the capability of manipulating cards is included. These embodiments rely on human players to manipulate the cards, and interacts with other players via audio drivers, tactile display, or visual display.

CONCLUSION, RAMIFICATIONS, AND SCOPE

The method disclosed herein enables identification of glyph bigrams in situations and conditions inaccessible to any existing process. Embodiments presented provide a new access to playing card games for people with limited or no vision.

The processor(s) in each of the disclosed embodiments is capable of any general purpose computing task. Additional applications could be installed to be run while the primary recognition task is not needed. For those embodiments designed toward accessibility for blind individuals example applications include, but are not limited to, music players, audiobook readers, text-to-speech applications, audio games, and audio web browsers.

The above description contains specifics which should be considered exemplifications of methods and embodiments, and should not be construed to limit the scope of the method or embodiments disclosed herein. The scope should be determined by the appended claims and their legal equivalents.

I claim:

1. A process of operating a computer, which comprises one or more processing units connected to one or more memories, to computationally identify those bigrams of glyphs within a digital image which belong to a known, finite set of glyph bigrams, by:
   a. isolating and labeling each contiguous blob within said image,
   b. computing a linkage vector between each of the labeled blobs,
   c. for each of the blobs linked by each of said linkage vectors, calculating a rectangular bounding box with two edges parallel to said linkage vector,
   d. for each of said linkage vectors, transforming raster data contained within said rectangular bounding box into a feature set suitable for input to a classifier which is configured to be sensitive to glyph orientation,
   e. for each of said feature sets, assigning a classification according to said classifier's output when provided said feature set as input,
   f. for each of the labeled blobs, selecting one linkage vector, corresponding blob which forms a bigram, and classification, whereby raster data contained in said image, representing luminous intensity projected upon an imaging sensor, is transformed into actionable information comprising the identities of each glyph bigram within said image.

2. The process of claim 1 wherein said classifier comprises one or more instances of one or more machine learning algorithms configured to recognize members of said finite set of glyph bigrams, and a means to unify output from each of said instance into a single classification.

3. The process of claim 2 wherein said classifier also provides a confidence score.

4. The process of claim 1 with additional means to selectively cull glyphs and/or linkage vectors based upon measured or calculated properties of individual glyphs, linkage vectors, or collections of glyphs and/or linkage vectors, whereby the computational workload is reduced, and the results are available to the user more quickly.

5. The process of claim 1 wherein the transformation of raster data includes rotation to a predetermined orientation such as a vertical alignment of the containing bounding box's primary axis.

6. The process of claim 1 wherein a single bounding box is calculated for each linkage vector such that said bounding box fully encompasses both glyphs of said linkage vector while said bounding box's primary axis is aligned parallel to said linkage vector, whereby subsequent operations identify the rank and suit after transformation of the raster information contained within said single bounding box rather than, or in addition to that from the individual bounding boxes created for each blob of the linkage.

7. The process of claim 1 wherein the transformation of raster data includes an affine transformation to compensate for perspective skew in the original image and its derivatives.

8. A device comprising one or more processors connected to one or more memories, one or more imaging sensors, and a means of non-visual output, programmed to: a. acquire one or more images from the connected image sensor, b. identify the rank and suit of each playing card present by means provided in claims 1, 2, 3, 4, 5, 6 or 7, c. convey rank and suit of each card thus identified to the user via non-visual output means, whereby a visually impaired user can participate in playing card games utilizing decks of widely-available, standard playing cards.

9. The device of claim 8 wherein said means of non-visual output is an electro-mechanical audio output, whereby a user may wear comfortable headphones and participate even if they are not braille-literate.

10. The device of claim 8 wherein said means of non-visual output is an electronically refreshable braille display, whereby a braille literate user can discreetly read the rank and suit of each card at their leisure.

11. The device of claim 8 which also incorporates supplemental lighting, whereby the device can operate properly even in poorly lit environments.

12. The device of claim 8 wherein multiple cameras are connected and oriented such that:
   a. one or more cameras have a clear view of the common area containing communal face-up cards, b. each user's cards, when held in-hand, are presented with a clear view to one or more cameras, and the processor is additionally programmed to provide the identities of all communal cards to each user, whereby no sighted player is required to read aloud the communal cards for the non-sighted players.

\* \* \* \* \*